United States Patent Office 2,760,318
Patented Aug. 28, 1956

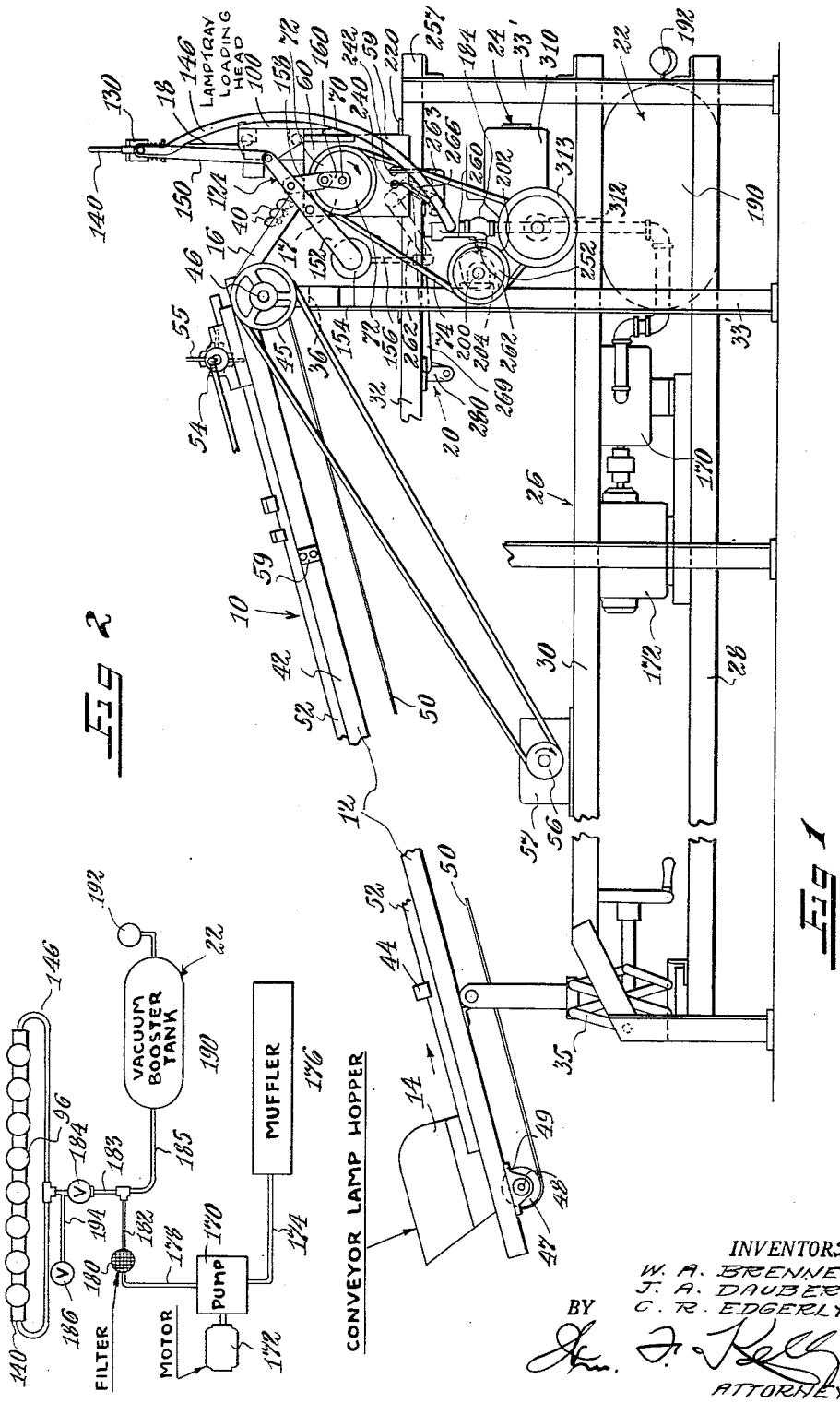

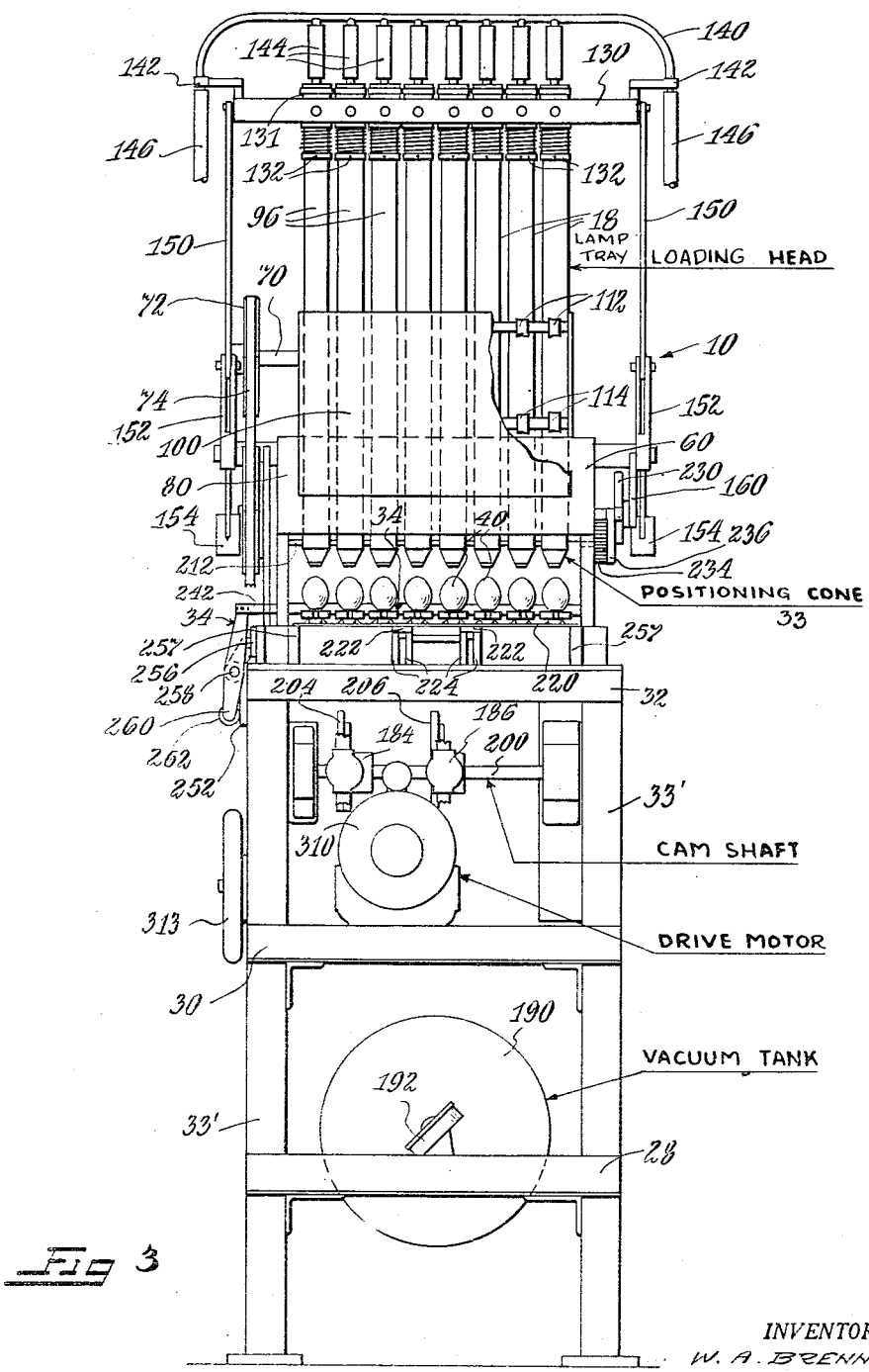

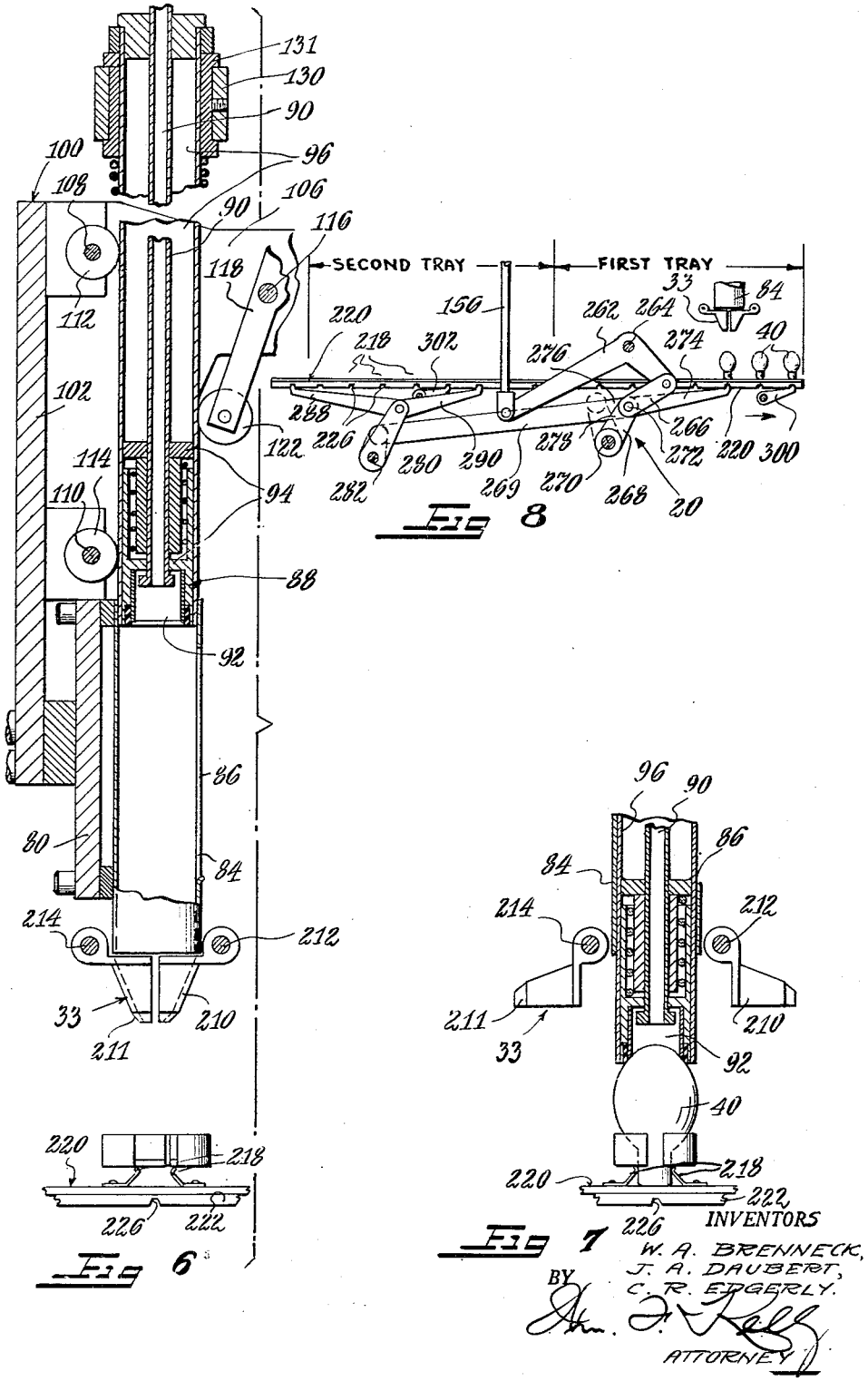

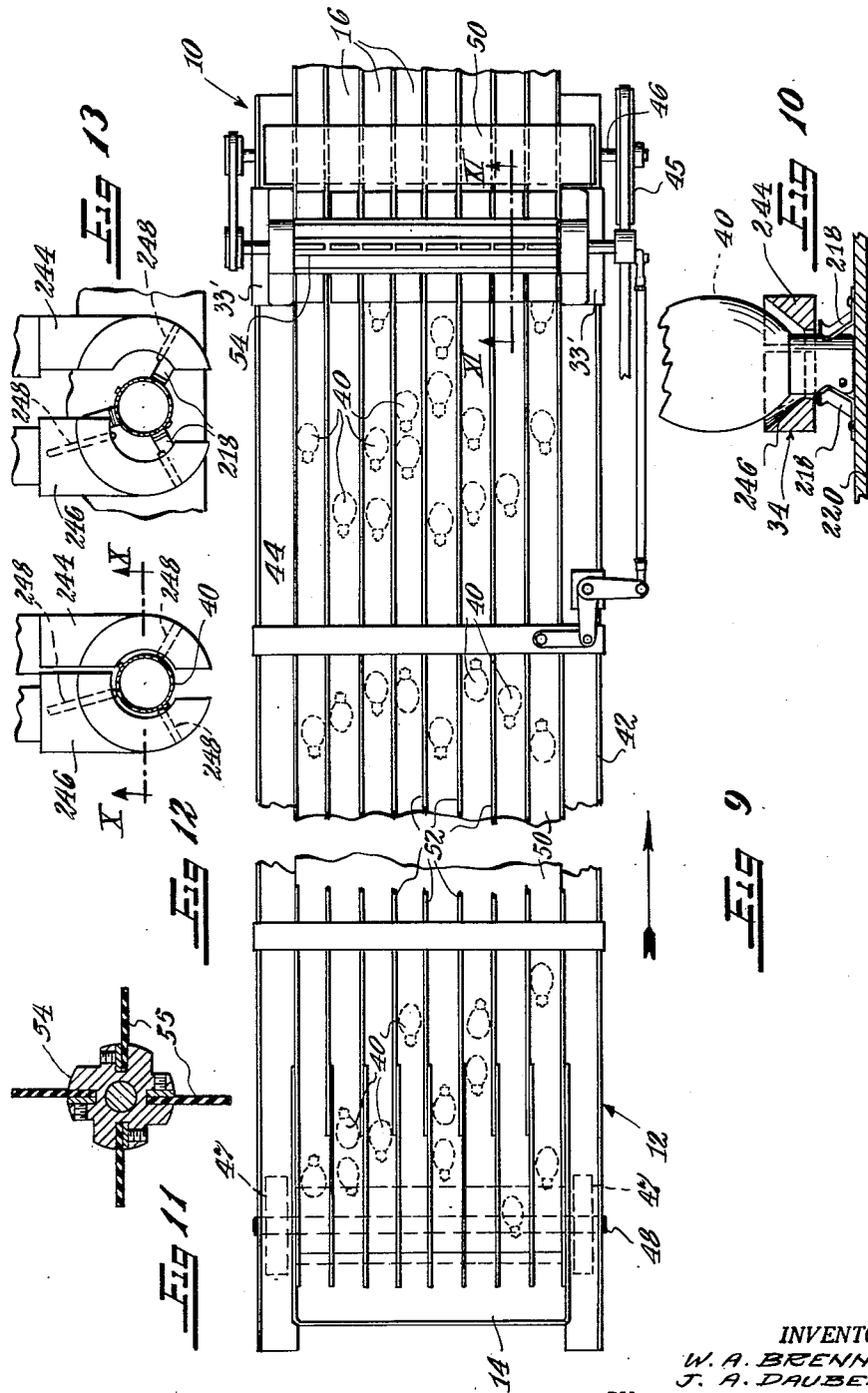

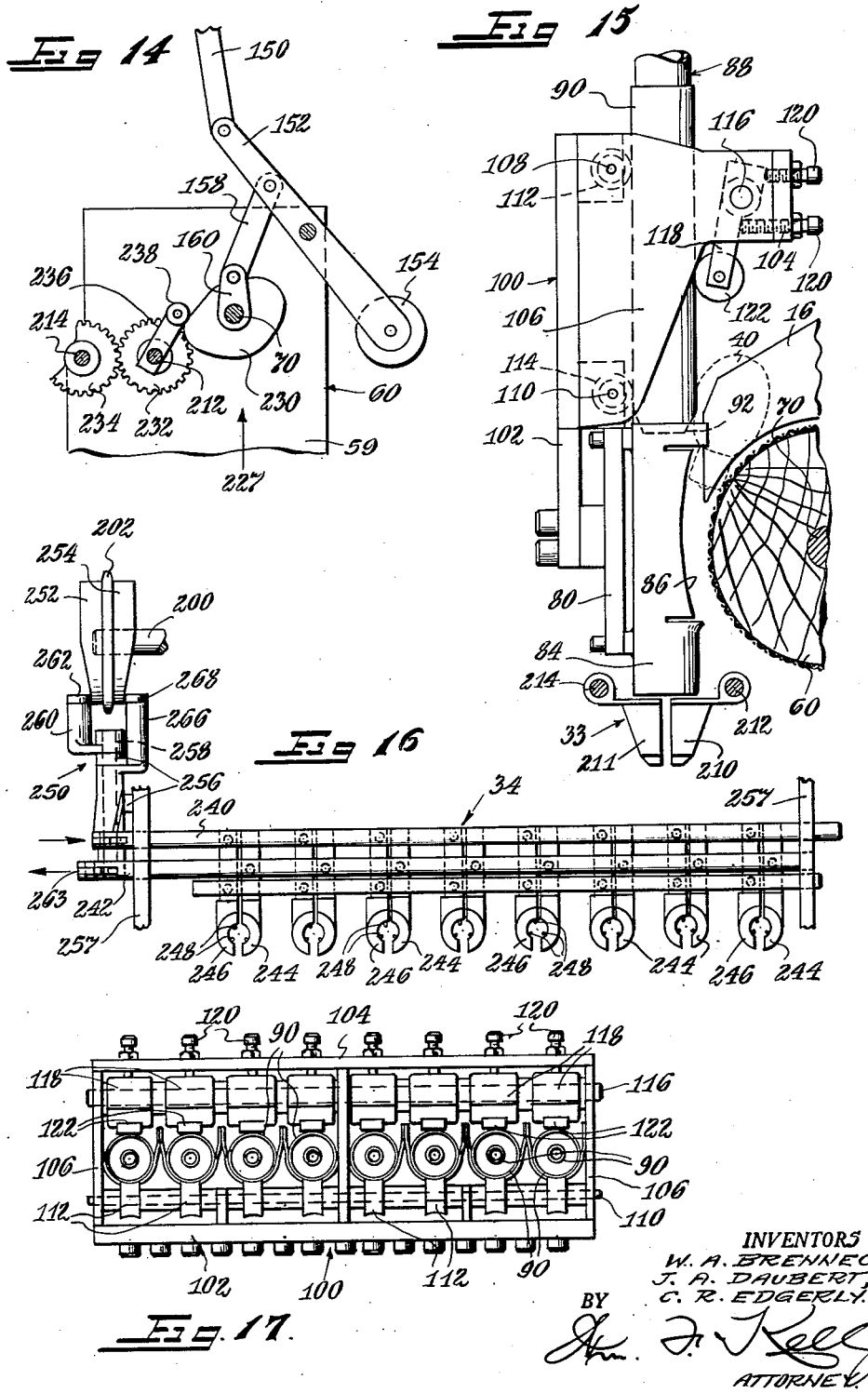

2,760,318

AUTOMATIC TRAY LOADING MACHINE FOR PHOTOFLASH LAMPS

William A. Brenneck, West Caldwell, and John A. Daubert and Charles R. Edgerly, Bloomfield, N. J., assignors to Westinghouse Electric Corporation, East Pittsburgh, Pa., a corporation of Pennsylvania Application September 1, 1953, Serial No. 377,884

5 Claims. (Cl. 53—142)

The present invention relates to the manufacture of photoflash lamps and, more particularly, to an automatic tray loading machine for such lamps.

In the manufacture of photoflash lamps, the lamp envelope is generally coated with a protective lacquer on the inside prior to the filling thereof with flashing foil, and the mounting and sealing of the igniting filament assembly therein. The photoflash lamp is then usually exhausted and filled with oxygen or air prior to tipping off from the exhaust position. A base is then secured about the sealed portion of the now exhausted lamp by a suitable cement and the lead wires are then soldered to the base in the usual manner.

After the basing operation it is customary to lacquer dip the outer surface of the now based lamp envelope to prevent and minimize the danger of explosions. In the past, the based lamps have been stacked by hand into the sockets of the dipping trays and then immersed in the lacquer solution. This hand loading operation is tedious, expensive and time consuming.

Hence, it has been found advantageous according to our invention to provide an automatic tray loading machine for the based photoflash lamps which will automatically, quickly and economically insert the based photoflash lamp into the dipping trays. The automatic tray loading device of our invention comprises essentially a combing conveyor to which the based bulbs are fed from a hopper, feeding chutes for delivering the now oriented bulbs to adjacent lamp tray loading heads, a lamp kicker roll at the bottom of the feeding chutes for delivering the lamps, base first, into slots in the outer sleeves of the loading heads and into positioning cones above the tray sockets therebeneath, a cam operated vacuum system connected to reciprocating vacuum pick-up cups or lamp pushers within the loading heads, a tray indexing device and a driving and timing means for said machine. It will be understood that the bulbs are loaded from a box into a hopper at one end of the combing conveyor and that the moving belt of the conveyor carries the lamps through a plurality of combs where the lamps are oriented base ahead or base behind.

A vacuum pick-up cup assembly within each of the loading heads is retractable upwardly to open up a lamp receiving slot of the outer sleeve of the loading head, thus admitting, with the aid of the lamp kicker roll, a lamp base downward into the positioning cones. At this point the vacuum pick-up cup assembly moves downward into contact with the top surface of the photoflash lamp bulb, and the vacuum system is energized, thus holding the lamp firmly in the pick-up cup. The vacuum pick-up cup (and the lamp) continue downwardly through the cam operated locating cones and inserts the photoflash lamp base first into the spring clip of the tray. In the conventional tray of 64 with eight rows and eight columns of spring clips, it is customary to employ eight combs in the combing conveyor, eight feeding chutes and eight loading heads to simultaneously load one row at a time. Upon the loading of one row, the vacuum system automatically releases and the vacuum pick-up cup assembly returns to its starting position within the loading head. The lamp tray indexing mechanism then advances the tray forwardly one row, and the cycle is repeated.

In its general aspect the objective of the present invention is to eliminate the hand loading of based photoflash lamps into dipping trays prior to the lacquer dipping of the outer surface of the photoflash lamp envelope.

A specific object of the present invention is an automatic tray loading machine for based photoflash lamps comprising a combing conveyor, a plurality of feeding chutes and loading heads for inserting the bulb in the tray, a vacuum system for said loading heads, a tray indexing mechanism and driving and timing means.

Other objects of the present invention will become apparent to one skilled in the art to which it appertains as the description thereof proceeds.

In the attached drawings in which like numerals of reference indicate similar parts throughout the several views:

Fig. 1 is a side elevational view of the automatic tray loading machine of our invention.

Fig. 2 is a diagrammatic view of the vacuum system for the loading heads.

Fig. 3 is an end elevational view of the automatic tray loading machine of Fig. 1 when viewed from the right showing the loading heads, the lamp tray indexing device and the driving and timing means of said machine.

Fig. 6 is a side elevational view, partially in section, of a loading head and a spring clip socket of a loading tray, showing the positioning cones in the closed position and the vacuum pick-up cup in the raised or photoflash lamp loading position.

Fig. 7 is a view similar to Fig. 6 showing the positioning cones in the open position and the insertion by the vacuum pick-up assembly of a photoflash lamp into the socket of the loading tray therebeneath.

Fig. 8 is a side elevational view of the lamp tray indexing mechanism.

Fig. 9 is a plan view of the combing conveyor and the conveyor wiper roll.

Fig. 10 is a vertical section of one pair of the base centralizing cups on the lines X—X of Fig. 12 in the direction of the arrows.

Fig. 11 is a vertical section of the conveyor wiper roll on the lines XI—XI of Fig. 9.

Fig. 12 is a plan view of one pair of the base centralizing cups in the closed position.

Fig. 13 is a view similar to Fig. 12, showing the cups in the open position.

Fig. 14 is a side elevational view of the positioning cone operating mechanism.

Fig. 15 is a side elevational view of a lamp pusher guide assembly.

Fig. 16 is a plan view of the base centralizing cup operating mechanism.

Fig. 17 is a plan view of the lamp pusher guide assembly.

Figure 4:
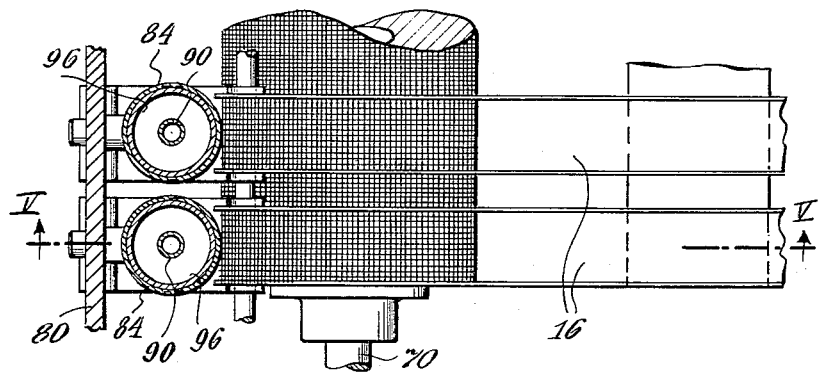
Fig. 4 is a sectional plan view of two of the feeding chutes and the loading heads, and the lamp kicker roll of the machine on line IV—IV of Fig. 5.

Referring to the drawings and more particularly to Fig. 1, the automatic tray loading machine for photoflash lamps of our invention is designated by the reference numeral 10.

This machine 10 comprises essentially a combing conveyor 12 provided with a lamp hopper 14, a plurality of feeding chutes 16, a lamp kicker roll 17, a plurality of loading heads 18, a photoflash lamp tray indexing mechanism 20, a vacuum system 22 and a driving and timing mechanism 24 all mounted on a frame 26 of the machine 10.

Frame

The frame 26 (Figs. 1 and 3) of the photoflash lamp tray loading machine 10 of our invention comprises essentially a lower vacuum system platform 28, an intermediate driving and timing mechanism platform 30 and a top tray platform 32 integrated together by a plurality of vertical uprights or angles 33' and horizontal cross bars. As shown in Fig. 1 the tray loading platform 32 of the frame 26 extends substantially half the length of the vacuum system and drive platforms 28 and 30 (Fig. 1). One pair of vertical uprights 33' of the frame 26 extend above the tray platform 32 and form the forward support for the combing conveyor 12. In addition the machine 10 is also provided with a positioning cone assembly 33 (Figs. 3, 6, 7, 14 and 15) and a base centralizing assembly 34 (Figs. 3 and 16).

Combing conveyor

The inclined combing conveyor 12 (Figs. 1 and 9) is mounted on its lower end by means of a jack 35 secured to the left hand end (when viewed in Fig. 1) of the frame 26 and is supported at its forward or higher end on a pair of vertical conveyor drive shaft mounting brackets 36 on the uprights 33'. It will be understood that the angle of the conveyor may be and should be adjusted by means of the jack 35 to bring the based photoflash lamps 40 up the inclined conveyor 12 fast enough to keep the feeding chutes 16 full. If the lamps 40 crowd each other at the top of the conveyor 12, the angle of the combing conveyor 12 may be made greater by lowering the adjustable jack 35.

As shown in Figs. 1 and 9, the combing conveyor 12 comprises essentially a pair of side rails 42 connected together by means of a plurality of cross bars 44. A pair of drive sprockets 45 (Fig. 9) are mounted on a drive shaft 46 rotatable in the vertical brackets 36. A pair of idler sprockets 47 are likewise mounted on an idler shaft 48 (Fig. 1) which in turn rotates in brackets 49 depending from the other end of side rails 42. Suitable rollers or crown belt pulleys on the drive shaft 45 and the idler shaft 48 (beneath the hopper 14) carry a conveyor belt 50 for supporting the lamps 40 in their upward travel through the inclined conveyor 12. Tangent screws, not shown, are provided at each side of the lower end of the conveyor 12 to permit belt adjustment.

As shown particularly in Figs. 1 and 9, the left-hand end or delivery portion from the hopper 14 comprises essentially the belt 50. Beginning with the first cross bar 44 a plurality of longitudinal combs or separator plates 52, for example 7 in the present showing of Fig. 9 extend substantially to the upper end of the combing conveyor 12. These combs 52 divide the combing conveyor belt 50 into a plurality of (eight in the present showing) lamp combing lanes for orienting the lamps 40 in either base ahead or base behind alignment. The combs 52 (Fig. 9) are affixed to the cross bars 44 and are provided with sufficient clearance with respect to the belt 50 to prevent wear thereof.

The delivery end of the combing conveyor 12 carries a conveyor wiper roll 54 for preventing the piling up of the lamps 40, one on top of the other, between the individual combs 52, prior to their delivery to their respective feeding chute 16. This wiper roll 54 (Figs. 1, 9 and 11) comprises essentially a cylindrical roll provided with a plurality (four in the present case) of resilient rubber wiper plates 55 projecting from the periphery of the roll 54. Each plate 55 is slit into segments, one for each combing lane. The roll 54 rotates continuously in a clockwise direction (Fig. 1) from the front side of the machine through the combing conveyor bulb lanes against the bulb flow and is driven by a pulley from the drive shaft sprocket 45 by a suitable pulley belt.

The drive sprockets 45 (Fig. 1) may be driven by a chain drive moved by a motor sprocket 56 on a variable speed motor 57. The motor 57 is suitably mounted on a plate secured to the driving and timing mechanism platform 30. A manually operated switch 59 on the side rail 42 of the conveyor 12 is employed to stop and start the motor 57.

Feeding chutes

Above the tray loading platform 32 of the frame 26 and between the vertical supports 33' and the right-hand vertical end supports (when viewed in Fig. 1) of the frame 26 a loading head support housing 60 (Figs. 1, 3 and 14) bridges the tray loading platform 32 and is secured thereto, as by bolts. The plurality of gravity type feeding chutes 16 (Figs. 1 and 9), eight in the present example, one for each of the combing conveyor lanes of the conveyor 12, have their lower or delivery end supported by brackets 62 (Fig. 5) upstanding from the housing 60. The upper end of the chutes 16 are supported on brackets (not shown) projecting from the vertical supports 33' of the frame 26.

Lamp kicker roll

Figure 5:
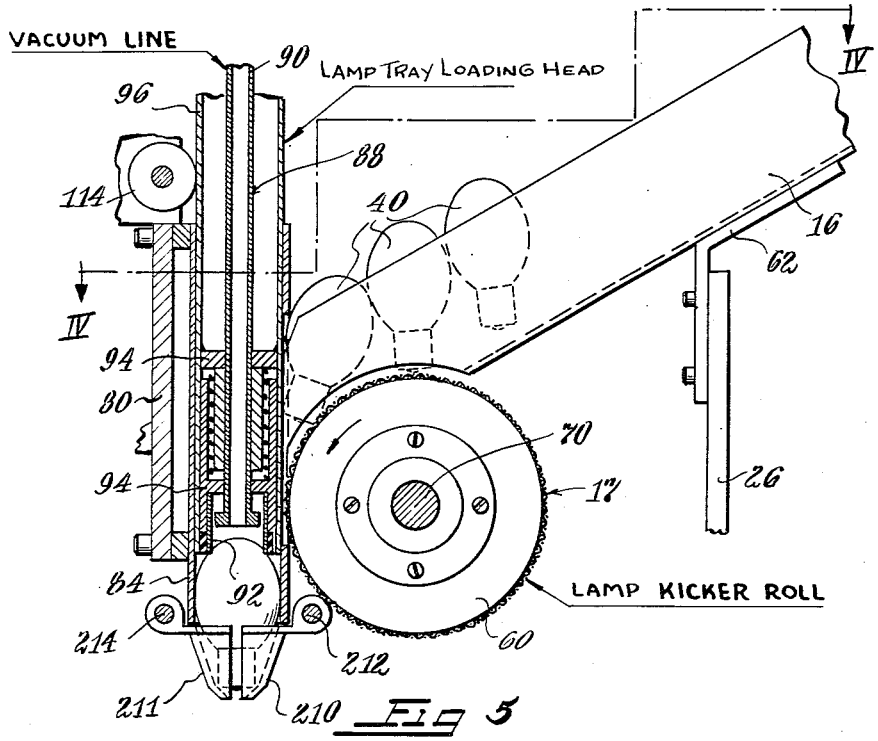
Fig. 5 is a sectional side elevational view of a feeding chute, the lamp kicker roll and a loading head showing in particular the loading slot in the outer sleeve of the loading head, the reciprocating vacuum pick-up assembly and the swingable positioning cones of the loading head on line V—V of Fig. 4.

A horizontal lamp kicker roll shaft 70 is journalled in the side plates 59 of the loading head support housing 60 (Figs. 1, 4 and 5). As shown in Fig. 1, the forward protruding portion of this shaft 70 carries a driven sprocket 72 for connection by a chain or belt drive 74 to the machine driving and timing mechanism 24, as hereinafter explained. The shaft 70 carries between the side plates 59 (Fig. 1) of the housing 60 the lamp kicker roll 17, a wire covered cylindrical cage which rotates in a counterclockwise direction when viewed in Fig. 5 to nudge a lamp 40, base first toward the end of the feeding chute 16.

Lamp tray loading heads

As shown particularly in Fig. 3, the front or delivery end of the loading head housing 60 is bridged by a front plate 80, suitably bolted (Figs. 4, 5 and 6) to the individual outer sleeves 84 of the loading heads 18. The plurality of outer sleeves 84 (Fig. 5) are suitably flush with this cover plate 80 and extend substantially downwardly to a point adjacent the bottom of the lamp kicker roll 76. In the side wall of each of the outer sleeves 84 there is provided, adjacent the delivery end of each of the feeding chutes 16, a loading slit 86 (Fig. 6) through which a lamp 40 is kicked base first, by the lamp kicker roll 17, as hereinafter explained. The loading heads 18 and the front plate 80 are pivotable backwardly on the side plates 59 of the housing 60 for cleaning. The heads 18 are held in their normal operating position by jig buttons (not shown) upstanding from the side plates 59 of the housing 60.

In each of the outer sleeves 84 there is provided a reciprocable vacuum pick-up cup assembly or bulb pusher assembly 88. Each of the bulb pusher assemblies comprises essentially an axial hollow vacuum pick-up rod 90 provided at its lower end with a vacuum pick-up cup 92 and fixed by discs 94 (Fig. 6) to an inner sleeve 96 which is free to reciprocate within but does not slide on the outer sleeve 84.

Bulb pusher guide assembly

Above the upper end of the outer sleeves 84, as shown in Figs. 1, 6, 14, 15 and 17, a bulb pusher guide or vacuum pick-up guide or inner sleeve guide assembly 100 is mounted by means of its front plate 102 (Figs. 6 and 7) to the aforementioned front cover plate 80 of the slicer head housing 60. This bulb pusher guide assembly 100 is an open box-like structure, which has, in addition to a front plate 102, a rear plate 104 and side plates 106, as shown in Figs. 6 and 15. A pair of vertically aligned horizontal upper and lower roller shafts 108 and 110 respectively extend through the side plates 106 of the inner sleeve guide assembly 100. Between the side plates 106 these two shafts 108 and 110 carry a plurality of upper and lower guide rollers 112 and 114, respectively. Each shaft carries one roller for each of the vacuum pick-up cup assemblies 88. These rollers 112 and 114 carried by the upper shafts 108 and 110 are suitably separated from one another by spacers (Fig. 3).

On the right hand side, as shown in Fig. 15, a third horizontal shaft 116 extends between the side plates 106 of the vacuum pick-up guide assembly 100. This shaft 116 carries a plurality of inclined and downwardly depending roller arms 118, eight in the present example, one for each of the vacuum pick-up assemblies 88 of the slicer heads 18. These arms 118 are held in any desired angular adjustment by a pair of adjustment screws 120, extending through the end plate 104 of the guide assembly 100. The lower depending end of each of these arms 118 carries a guide roller 122 for engagement with the periphery of an inner sleeve 94 of a vacuum pick-up cup assembly 88, which is reciprocable by an operating mechanism 124 (Fig. 1).

*Lamp tray loading head reciprocating mechanism*

As shown particularly in Figs. 3 and 6, the upper portions of each of the inner sleeves 96 of the vacuum pick-up up assemblies 88 are connected by a driving yoke 130. Bolts extend through the side members of the yoke 130 and a cylindrical sleeve 131 (Fig. 6) surrounding each inner sleeve 96. Each inner sleeve 96 carries a fixed lower collar 132. A spring 136 extends between the lower shoulder of sleeve 131 and the fixed collar 132 on the inner sleeve 96. The yoke 130 floats on the inner sleeves 96 to cushion the downward movement of the pick-up cup assemblies 88, as hereinafter explained.

A vacuum manifold 140 (Figs. 1 and 3) secured by brackets or angles 142 on the ends of the yoke 130 is provided with a plurality of downwardly depending risers 144, one for each pick-up rod 90. These risers 144 are connected by suitable rubbers to the pick-up rods 90. Flexible lead-in lines 146 connect the vacuum system 22 to the manifold 140.

As shown in Figs. 1 and 3, each side of the yoke 130 is pivotably connected to a connecting rod 150 depending from the yoke 130. The lower end of each connecting rod 150 is pivotably connected to the upper end of a counterweight lever 152 pivoted on the side plates 59 of housing 60 and carrying a counterweight 154 and a tray indexing mechanism operating rod 156 (Fig. 8) on its lower end. This counterweight lever 152 has its upper arm suitably connected to a link 158 at its middle portion. A driver arm 160 on the lamp kicker roll shaft 70 in turn drives the lower end of the link 158.

At a predetermined time in the operating cycle, as hereinafter explained, as the lamp kicker roll shaft 70 is rotated in a clockwise direction from the position shown in Fig. 1, the upper end of the counterweight lever 152 moves downwardly and carries with it the connecting rod 150, the yoke 130 and hence the vacuum pick-up cup assemblies 88 of shaft 70 of the loading heads 18. At the end of one complete revolution the pick-up assemblies 88 have been returned by the above described mechanism to the starting position as shown in Fig. 1.

*Vacuum system*

The vacuum system 22 is mounted on the right hand end, when viewed in Fig. 1, of the vacuum system platform 28 of the frame 26. This system (Fig. 2) has a pump 170 driven by a motor 172. A line 174 (Fig. 2) connects one side of the pump to a muffler 176. The exhaust side of the pump 170 is connected by a line 178 to a filter 180. A line 182 extends from the filter 180 through a suitable T. One side of the T is connected by a line 183 to a cam operated vacuum valve 184. The other side of the T is connected by a line 185 to a vacuum booster tank 190 provided with a vacuum gauge 192. A second cam operated vacuum valve 186 is connected by a line 194 to a line 195 extending from the first valve 184 to a junction with the lines 146 of the manifold 140. In addition, the vacuum system has a timing and drive mechanism 196 (Figs. 1 and 3).

*Vacuum system timing and driving mechanism*

As shown in Figs. 1 and 3, a cam shaft 200 is suitably journaled in brackets projecting from the side of the vertical uprights 33'. As shown particularly in Fig. 1 this cam shaft 200 carries a sprocket wheel 202 driven by the chain drive 74 of the lamp kicker roll 17. The inner portions of the cam shaft between the uprights 33' of the frame 26 (Fig. 3) are provided with valve cams 204 and 206 for engagement respectively with the valve stems of the vacuum valves 186 and 184. Through the action of the raised portions of these cams 204 and 206, the valves 184 and 186 of the vacuum system 22 are opened and closed at a predetermined time in the operating cycle, as hereinafter explained.

As shown in Fig. 2 when a vacuum is not required by the vacuum pick-up cup assemblies 88 of the loading heads 18 the atmosphere valve 186 is normally open and the valve 184 is normally closed, thus permitting the pump 170 to evacuate the vacuum booster tank 190 and the connecting lines behind the closed valve 184. At a predetermined time during the operation of the machine 10, for example, when the vacuum pick-up assemblies are being reciprocated downwardly in the pick-up guide assembly 100, vacuum is desired within the pick-up cup assembly 88. The cam 204 closes the atmosphere valve 186 and immediately thereafter opens the valve 184 when the pick-up cups 92 engage the lamp 40, thus evacuating air from the pick-up assemblies 88, the manifold 140, and the connecting lines 146 by means of the vacuum booster tank 190 and the pump 170 and securing the lamp envelopes in the cups 92.

*Positioning cone assembly*

As shown in Figs. 3, 5, 6 and 7, the positioning cone assembly 33 has a plurality of pairs of positioning half-cones. Each pair comprises rear half-cone 210 and a front half-cone 211, swingable on a pair of horizontal shafts 212 and 214 respectively. These cones are positioned adjacent the lower end of the outer sleeve 84 of each of the slicer heads 18. These parallel shafts, namely, front shaft 212 and rear shaft 214, are journalled in the side plates 59 of the loading head housing 60. The positioning half-cones 210 and 211 (Figs. 6 and 7) are swingable on their respective shafts (respectively) toward the back and the front of the machine 10, away from the axis of the slicer heads 18.

In their normal or lamp receiving position these positioning half-cones 210 and 211 are closed (Fig. 6). During the downward movement of the vacuum pick-up assemblies 88 of the loading heads 18 (after pick-up of the lamps 40 thereby) the positioning half-cones 210 and 211 are swingable through cam action, as hereinafter described, to the position shown in Fig. 7. The half-cones 210 and 211 are contoured to receive a lamp 40, base first, for approximately positioning and aligning the lamp 40 in an axial position prior to delivery by a vacuum pick-up assembly 88 therethrough into contact with a clip 218 of the lamp tray 220 positioned therebeneath (Figs. 6 and 7).

These trays 220, as hereinbefore mentioned each may carry eight rows and eight columns of spring clips 218. They carry longitudinal runners 222 (Figs. 6 and 7) on their bottom surface for engagement with the side rails 224 (Fig. 3) of the tray indexing mechanism 20. In addition, the runners 222 are provided with a plurality of indexing slots 226 (Fig. 8) in their bottom surface transverse to the runners 222, for employment also with the indexing mechanism 20, as hereinafter explained.

Positioning cone operating mechanism

As shown in Fig. 14 a positioning cone operating mechanism 227 has a positioning cone cam 230 on the lamp kicker roll crank shaft 70 between the side plate 59 of the slicer head housing 60 and the drive arm 160 of the slicer head reciprocating mechanism, hereinbefore described. The positioning cone shafts 212 and 214 carry respectively a driver gear 232 and a driven gear 234 on their respective ends which extend beyond the side plate of the loading housing 60. The shaft 212, in addition to the driver gear 232, is provided with a cam roller arm 236 for carrying on its outer end, a cam roller 238 for engagement with the positioning cone cam 230.

Thus, it will be seen from Fig. 14 that as the lamp kicker roll shaft 70 and hence the positioning cone cam 230 rotate in a clockwise direction the roller 238 engages a raised portion of the positioning cone cam 230 and itself moves in a counterclockwise direction. Counterclockwise motion of the roller arm 236, the driver gear 232 and the positioning cone shaft 212 moves the rearward positioning cones 210 toward the combing conveyor 12. In turn, the driven gear 234 and the positioning cone shaft are moved by the driver gear 232 in a clockwise direction, thus swinging the front positioning cones 211 toward the front of the machine, when viewed in Figs. 6 and 7.

Base centralizing cup assembly

The base centralizing cup assembly 34 (Figs. 3, 10 12, 13 and 16) is located below the positioning cone assembly 33 and above the spring clips 218 of the tray 220. Similar to the positioning cone assembly 33, the base centralizing cup assembly 34 has a pair of horizontal shafts (Fig. 16), namely, rear shaft 240 and front shaft 242 reciprocable horizontally in the side plates 59 of the loading head housing 60. The rear shaft 240 carries (below each pair of positioning half-cones and above each spring clip 218 of a tray 220) a right hand (when viewed in Fig. 16) centralizing half cup 244. In like manner the front shaft 242 carries the left hand centralizing half-cup 246. When the two half-cups 244 and 246 are in their closed or base centralizing position (Fig. 12) beneath the positioning half cones 210 and 211, a base receiving aperture machined in each forms a frusto-conical opening diverging upwardly toward the positioning half-cones 210 and 211.

In addition the left hand half-cup 246 and the right hand half-cup 244 are provided (Figs. 12 and 13) with, two and one respectively, tapered base centralizing pins 248. When the cups 244 and 246 are together in the closed base centralizing position (Fig. 12) these pins 248 projecting from the frusto-conical aperture and guide the base of a lamp 40 (held in the vacuum pick-up cup assembly 88 of the slicer head 18 thereabove) into exact axial contact with the spring clip 218 of the tray 220 therebeneath.

As is well known in the art the base of the photoflash lamp 40 is provided with two bayonet pins thereon. Without the aid of the centralizing pins 248 the bayonet pins of the base of the lamp 40 might slide through the open space between the right hand half-cup 244 and the left hand half-cup 246 (Figs. 12 and 16) thus improperly aligning the base of the lamp 40 with respect to the spring clip 218 below. In addition the base centralizing cup assembly 34 has an operating mechanism 250.

Base centralizing cup operating mechanism

This base centralizing cup operating mechanism 250 has a front and back open faced cam 252 and 254 when viewed in (Fig. 16) affixed to the cam shaft sprocket wheel 202 on the vacuum valve cam shaft 200. A shaft supporting bracket 256 mounted on the adjacent tray side rail or angle 257 (Fig. 3) of the tray platform 32 of the frame 26 has a horizontal lever shaft 258 journalled therein. This shaft 258 carries a cam roller arm 260 provided with a roller 262 on its outer end for engagement with the front open faced cam 252. An operating arm 263 (Figs. 1 and 16) is also provided on the shaft 258, extends upwardly therefrom and has its upper notched or bifurcated end pinned to the front centralizing shaft 242 which protrudes beneath the side wall 59 of the loading head housing 60. A bell-crank lever 266 having its upper arm in similar engagement with the rear centralizing shaft 240 is pivotable on the shaft 258 and has its lower cam roller carrying arm provided with a roller 268 for engagement with the rear open faced cam 254 on sprocket 202 on shaft 200.

Thus, it will be seen that as the valve cam shaft 200 and hence the sprocket wheel 202 and the open faced cams 252 and 254 rotate in a clockwise direction (Fig. 1) the rollers 262 and 268 (Fig. 16) respectively engage the low dwell portions of the above mentioned open faced cams 252 and 254, thus causing the centralizing cup assembly shafts 242 and 240 to be moved respectively, outwardly from and inwardly through the side plate 59 of the slicer head housing 60. Obviously, this movement of the shafts 242 and 240 causes the half-cups 244 and 246 to open or move away from the axis of the loading head 18 and the spring clips 218.

Tray indexing mechanism

As shown particularly in Figs. 1 and 3, the trays 220 are loaded in the guide rails 257 of the tray platform 32. The tray indexing mechanism 20 (Figs. 3 and 8) has a pair of longitudinal guide rails 224 on each side (Fig. 3) which are affixed to a cross support of the frame 26 or to the bottom surface of the tray loading platform 32. As shown particularly in Fig. 3, the longitudinal runners 222 of a tray 220 are supported on and guided by the guide rails 224 of the tray indexing mechanism 20.

The operating rod 156 of the lamp tray indexing mechanism 20, as mentioned before (Fig. 1), has its upper end connected to the lower end of the counterweight lever 152. Hence, as the upper end of the counterweight lever 152 is being moved in an upwardly direction during the retraction of the vacuum pick-up cup assemblies 88, the operating rod 156 (Fig. 1) is moving downwardly to index the lamp trays 220 thereon, one row to the right, when viewed in Fig. 8.

In considering Fig. 8, which shows only one-half of the tray indexing mechanism 20, it will be understood that the parts of the indexing mechanism 20 hereinafter described are mounted in the slot between the pair of side rails 224 and are duplicated (but not shown in Fig. 8) on the other side of the tray indexing mechanism 20. The tray indexing mechanism 20, as shown in Fig. 8, is at the beginning of or at the end of an indexing operation.

The lower end of the operating rod 156 is pinned to one end of a bell crank lever 262. This lever 262 is pivotable on a shaft 264 extending through the guide rails 224 of the tray indexing mechanism 20 (Fig. 8). The downwardly depending arm of the bell crank lever 262 is connected by a link 266 to a drive arm 268 affixed on a horizontal shaft 270, suitably below the upper shaft 264. This lower shaft 270, like the upper shaft 264, likewise is journalled in the side rails 224.

A pin 272 which connects the lower portion of the link 266 to the upper portion of the drive arm 268 also extends through the right hand end portion (when viewed in Fig. 8) of a connecting link 269 and carries a spring loaded follow-up pawl 274 thereon. This pawl 274 has a pin 276 extending from its hub from which a spring 278 depends. The lower end of the spring 278 is suitably connected to the drive arm 268.

The left hand end of the connecting link 269 (when viewed in Fig. 8) is pivotably connected to a bell crank lever 280 on a second lower horizontal shaft 282 likewise journalled in the side rails 224. The other arm of the lever 280 is pinned at its upper end to a spring loaded "long" follow-up pawl 288 and a spring loaded "short" follow-up pawl 290. As in the case of the follow-up pawl 274, both the long and short pawls 288 and 290 are provided with pins projecting from their respective hubs, which are connected by springs, as shown, extending to the drive arm of the lever 280.

A pair of retaining pawls, namely, front retaining pawl 300 and rear retaining pawl 302 are suitably spring loaded and mounted in the slots (not shown) provided between each pair of side rails 224 to retain the trays 220 in their loading position during the retraction of the above described indexing mechanism but prior to the actual indexing of the trays.

It will be understood that as the operating rod 156 is moved upwardly during the downward descent of the loading head assemblies 88, that the lower arm of the bell crank lever 262 on upper shaft 264 moves clockwise and hence the drive arm 268 on lower shaft 270 rotates counterclockwise, to the dotted position shown in Fig. 8. This motion causes the spring 278 on the follow-up pawl 274 to be extended, thus removing the contacting tip of the pawl 274 from its engagement with its indexing slot 226 and causing it to slide to the left (when viewed in Fig. 8) along the bottom surface of the tray 220 to engage the next indexing slot therebehind.

Simultaneously, the connecting link 260 causes the drive arm of the lever 280 on lower shaft 282 to likewise move in a counterclockwise direction, to extend the springs 292 and 294 on the long pawl 288 and the short pawl 290 respectively, causing them to also move downwardly from engagement with their respectively indexing slots 226 and also to move along the bottom surface of the second tray 220 to the left (when viewed in Fig. 8) into engagement with the next indexing slot 226.

At the end of the tray loading operation by the slicer heads 18 thereabove, the operating rod 156 moves downwardly and the drive arms 268 and 284 return in a clockwise direction to their former position, as shown in Fig. 8. This respective motion releases the springs 278, 292 and 294 and causes the respective follow-up pawls 274, 288 and 290 to move the trays, namely, the first tray engaged by the follow-up pawl 284 and the second tray engaged by the pawls 288 and 290 to the right, one row, thus indexing an empty row of spring clips 218 underneath the slicer heads 18. It will be understood that the slot engaging tips of the retaining pawls 300 and 302 are tapered so as not to resist the motion of the trays 220 to the right, when viewed in Fig. 8.

*Driving and timing mechanism*

The driving and timing mechanism 24 comprises essentially a drive motor 310 (Figs. 1 and 3) secured to the right hand portion of the driving and timing mechanism platform 30 beneath the loading head housing 60 and above the vacuum booster tank 190. A drive sprocket 310 on the motor shaft is connected by means of the chain drive 74 to the cam shaft sprocket 202 and the lamp kicker roll sprocket 72. A hand wheel 313, also on the motor shaft, permits manual operation of the machine 10.

It will be understood that while in the showing of Figure 1 the combing conveyor 12 has its own separate variable speed motor 57, it is also possible to drive the combing conveyor drive sprockets 45 by means of a chain drive, not shown, extending to one of the sprockets 45 from an additional sprocket on the lamp kicker roll shaft 70, adjacent the lamp kicker roll sprocket 72. In either case the conveyor wiper roll 54, as hereinbefore mentioned, is driven by means of a pulley on the conveyor wiper roll shaft 46 and a suitable pulley belt driven by a pulley on the combing conveyor drive shaft 46.

Assuming that the drive shaft of the drive motor 310 and the drive sprocket 310 rotate in a clockwise direction, it is therefore obvious from Fig. 1 that the cam shaft sprocket 202 and the lamp kicker roll shaft sprocket 72, also rotate in clockwise direction. Further, if the combing conveyor sprocket 45 is connected by means of a chain drive to the lamp kicker roll shaft 70 the combing conveyor sprocket 45 will likewise rotate in clockwise direction. If, in the case of the showing of Fig. 1, a variable speed motor 57 is employed as the combing conveyor drive, it will be assumed to rotate likewise in a clockwise direction, thus insuring that the conveyor belt 50 will move upwardly in the desired direction.

*Operation*

According to our invention based photoflash lamps 40 may be dumped from a box, not shown, into (or loaded by hand into) the conveyor lamp hopper 14. These lamps 40 are moved by the belt 50 of the combing conveyor 12 through the combs 52 and formed to eight, in the present showing, combing lanes of the photoflash lamps 40 (either base ahead or base behind) up to the conveyor wiper roll 54. If for some reason despite the presence of the cross supports 44 of the combing conveyor 12, the photoflash lamps 40 are piled on top of another near the delivery end, the segmented rubber wiper plates 55 of the wiper roll 54 unpile the stacked lamps 40. This permits the one by one delivery of the lamps 40 in each combing lane into their respective feeding chutes 16 from which they are fed by gravity into position against the delivery slot 86 in the respective outer sleeves 84 of the loading heads 18.

At this point in the operating cycle of the tray loading machine 10, the vacuum pick-up assemblies 88 are reciprocated upwardly by the aforementioned loading head reciprocating mechanism 124, thus opening the delivery slot 86 in each of the outer sleeves 84 and admitting (with the aid of the clockwise rotating lamp kicker roll 17) a lamp 40 base first into the outer sleeve 84 of each of the loading heads 18. The lamps 40 fall downwardly into contact with the now closed positioning cone assembly 33 below the loading heads 18.

It will be understood that simultaneously with the upward movement of the vacuum pick-up cup assemblies 88 that the tray indexing mechanism 20 moves the trays 220 to the right (when viewed in Fig. 1) one row so that an empty row of the spring clips 218 are aligned beneath the now filled loading heads.

The vacuum pick-up cup assemblies 88 are then reciprocated downwardly by the loading head reciprocating mechanism 124 until the pick-up cups 92 engage the upper portions of the lamps 40 within the outer sleeves 84. Slightly before this contact is made between pick-up cups 92 and the lamps 40, the atmosphere valve 186 of the vacuum system 22 is closed by means of the cam 206 and the valve 184 of the vacuum system 22 is opened by means of the cam 204 to create a vacuum within each of the vacuum pick-up cup assemblies 88. At the time of contact between the pick-up cup 92 and the envelopes of the lamps 40, the lamps 40 are securely affixed to the cups 92.

After the lamps 40 are secured within the pick-up cups 92 the positioning cone assembly 33 is opened by means of the positioning cone operating mechanism 222. The vacuum pick-up cup assemblies 88 with the lamps 40 secured thereto continue downwardly through the base centralizing assembly 34 until the bases of the lamps 40 are secured within the spring clips 218 of the tray 220 therebeneath. It will be understood that the downward descent of the vacuum pick-up cup assemblies 88 and the lamps held therein is one continuous uninterrupted motion. It will be remembered that during the downward motion of the vacuum pick-up cup assemblies 88, the tray indexing mechanism 20 and, more particularly, the follow-up pawls 274, 288 and 290 are indexed one slot to the left when viewed in Fig. 8.

Once the lamps 40 are secured within the spring clips 218 the base centralizing assembly 34 is opened by the base centralizing cup operating mechanism 250. Simultaneously, with the opening of the base centralizing assembly 34 the cam 204 and 206 respectively, first close the valve 184 and then open the atmospheric valve 186 of the vacuum system 122 to shut-off the vacuum and to release the lamps 40 from the pick-up cups 92 of the loading heads 18.

The vacuum pick-up cup assemblies 88 then reciprocate upwardly through the outer sleeves 84 and the pick-up cup guide assembly 100 to again uncover the delivery slots 86 in the outer sleeves 84 and permit the delivery of another set of lamps 40 into the outer sleeves 84. However, before the delivery slots 86 are opened by the upward motion of the assemblies 88, the positioning cone assembly 33 and the base centralizing assembly 34 have been closed by their respective operating mechanisms 222 and 250.

As hereinbefore described the upward movement of the vacuum pick-up cup assemblies 88 causes the tray indexing mechanism 20 to move the trays 220 thereon to the right (when viewed in Fig. 8) one row. The above described operating cycle is then repeated until a tray 220 has been filled with lamps 40. Whereupon the loaded tray 220 is removed from the automatic tray loading machine 10 by hand and transported to the envelope lacquer dipping operation.

Although a preferred embodiment of our automatic tray loading machine has been described, it will be understood that modifications may be made within the spirit and scope of the invention.

We claim:

1. An automatic tray loading machine for based photoflash lamps having a frame, an inclined combing conveyor mounted on said frame for aligning a mass of photoflash lamps into a plurality of aligned single file lanes of lamps, a plurality of lamp tray loading heads having their housing mounted on said frame adjacent the delivery end of said combing conveyor and for segregating, positioning and feeding simultaneously a row of lamps into a lamp tray therebeneath, a plurality of vacuum pick-up cup assemblies reciprocable within said loading heads, a plurality of feeding chutes on said frame intermediate between the delivery end of said conveyor and said loading heads, a lamp kicker roll on said frame adjacent the delivery end of said feeding chutes for delivering a row of lamps base forward to said loading heads, a positioning cone assembly mounted on said loading head housing benath said loading heads and above said tray for arresting the delivery of said lamps into said loading heads to permit securement of said lamps within said heads, a vacuum system on said frame for intermittently providing a vacuum within said vacuum pick-up cup assemblies and a driving and timing mechanism on said frame for driving and timing the cycle of operation of said machine.

2. An automatic tray loading machine for based photoflash lamps having a frame, an inclined combing conveyor mounted on said frame for aligning a mass of photoflash lamps into a plurality of aligned single file lanes of lamps, a plurality of lamp tray loading heads having their housing mounted on said frame adjacent the delivery end of said combing conveyor and for segregating, positioning and feeding simultaneously a row of lamps into a lamp tray therebeneath, a plurality of vacuum pick-up cup assemblies reciprocable within said loading heads, a plurality of feeding chutes on said frame intermediate between the delivery end of said conveyor and said loading heads, a lamp kicker roll on said frame adjacent the delivery end of said feeding chutes for delivering a row of lamps base foward to said loading heads, a positioning cone assembly mounted on said loading head housing beneath said loading heads and above said tray for arresting the delivery of said lamps into said loading heads to permit securement of said lamps within said heads, a base centralizing assembly on said loading head housing beneath said positioning cone assembly and above said tray for aligning the bases of the lamps delivered by said loading heads to said tray, a vacuum system on said frame for intermittently providing a vacuum within said vacuum pick-up cup assemblies and a driving and timing mechanism on said frame for driving and timing the cycle of operation of said machine.

3. An automatic tray loading machine for based photoflash lamps having a frame, an inclined combing conveyor mounted on said frame for aligning a mass of photoflash lamps into a plurality of aligned single file lanes of lamps, a plurality of lamp tray loading heads having their housing mounted on said frame adjacent the delivery end of said combing conveyor and for segregating, positioning and feeding simultaneously a row of lamps into a lamp tray therebeneath, a plurality of vacuum pick-up cup assemblies reciprocable within said loading heads, a plurality of feeding chutes on said frame intermediate between the delivery end of said conveyor and said loading heads, a lamp kicker roll on said frame adjacent the delivery end of said feeding chutes for delivering a row of lamps base forward to said loading heads, a positioning cone assembly mounted on said loading head housing beneath said loading heads and above said tray for arresting the delivery of said lamps into said loading heads to permit securement of said lamps within said heads, a tray indexing mechanism on said frame beneath said trays for indexing said tray forwardly one row toward the delivery end of said machine, a vacuum system on said frame for intermittently providing a vacuum within said vacuum pick-up cup assemblies and a driving and timing mechanism on said frame for driving and timing the cycle of operation of said machine.

4. An automatic tray loading machine for based photoflash lamps having a frame, an inclined combing conveyor mounted on said frame for aligning a mass of photoflash lamps into a plurality of aligned single file lanes of lamps, said conveyor having a based lamp hopper at its loading end, a plurality of lamp tray loading heads having their housing on said frame adjacent the delivery end of said combing conveyor and for segregating, positioning and feeding simultaneously a row of lamps into a lamp tray therebeneath, a plurality of vacuum pick-up cup assemblies reciprocable within said loading heads, a plurality of feeding chutes on said frame intermediate between the delivery end of said conveyor and said loading heads, a lamp kicker roll on said frame adjacent the delivery end of said feeding chutes for delivering a row of lamps base first to said loading heads, a positioning cone assembly on said loading head housing beneath said loading heads and above said tray for arresting the delivery of said lamps into said loading heads to permit securement of said lamps within said heads, a base centralizing assembly on said loading head housing beneath said positioning cone assembly and above said tray for aligning the bases of the lamps delivered by said loading heads to said tray, a tray indexing mechanism on said frame beneath said trays for indexing said tray forwardly one row toward the delivery end of said machine, a vacuum system on said frame for intermittently providing a vacuum within said vacuum pick-up cup assemblies and a driving and timing mechanism on said frame for driving and timing the cycle of operation of said machine.

5. An automatic tray loading machine for based photoflash lamps having a frame, an inclined combing conveyor mounted on said frame for aligning a mass of photoflash lamps into a plurality of aligned single file lanes of lamps, said conveyor having a based lamp hopper at its loading end and a conveyor wiper roll assembly on its delivery end, a plurality of lamp tray loading heads having their housing on said frame adjacent the delivery end of said combing conveyor and for segregating, positioning and feeding simultaneously a row of lamps into a lamp tray therebeneath, a plurality of vacuum pick-up cup assemblies reciprocable within said loading heads, a plurality of feeding chutes on said frame intermediate between the delivery end of said conveyor and said loading heads, a lamp kicker roll on said frame adjacent the delivery end of said feeding chutes for delivering a row of lamps base first to said loading heads, a positioning cone assembly on said loading head housing beneath said loading heads and above said tray for arresting the delivery of said lamps into said loading heads to permit securement of said lamps within said heads, a base centralizing assembly on said loading head housing beneath said positioning cone assembly and above said tray for aligning the bases of the lamps delivered by said loading heads to said tray, a tray indexing mechanism on said frame beneath said trays for indexing said tray forwardly one row toward the delivery end of said machine, a vacuum system on said frame for intermittently providing a vacuum within said vacuum pick-up cup assemblies and a driving and timing mechanism on said frame for driving and timing the cycle of operation of said machine.

References Cited in the file of this patent

UNITED STATES PATENTS

| | | |
|---|---|---|
| 859,772 | Hoyt | July 9, 1907 |
| 1,247,722 | Rogers | Nov. 27, 1917 |
| 2,439,883 | Brown et al. | Apr. 20, 1948 |